United States Patent Office 3,163,624
Patented Dec. 29, 1964

---

3,163,624
CYCLIC POLYMERS FROM TRIMETHYLENE DIISOCYANATES
William B. Black and Wesley L. Miller, Raleigh, N.C., assignors to Monsanto Company, a corporation of Delaware
No Drawing. Filed June 5, 1962, Ser. No. 200,062
18 Claims. (Cl. 260—77.5)

This invention relates to new high temperature resistant fiber, filament and film forming diisocyanate polymers prepared via a cyclic polymerization mechanism and to a process for their preparation.

It is well established that organic isocyanates may be polymerized to high molecular weight linear organic polymers. The polymerization reaction involves treating an organic isocyanate under anhydrous conditions with an alkali metal anionic catalyst at a temperature below about $-20°$ C. in a non-reactive solvent for the catalyst and the organic isocyanate. This reaction is set forth in detail in U.S. Patent 2,965,614, issued December 20, 1960, to Shashoua. The mechanics of cyclic polymerization reactions involving double bonds were postulated by George B. Butler and Rudolph J. Angelo in the Journal of the American Chemical Society, vol. 79, p. 3128 (1957) and elucidated by George B. Butler, Allan Crawshaw and W. Lamar Miller in the Journal of the American Chemical Society, vol. 80, p. 3615 (1958). Prior to this invention there has been no example of cyclic polymerization of diisocyanates via a chain propagation mechanism to linear polymers.

An object of this invention is to provide new thermostable fiber, filament and film forming polymers from diisocyanate monomers. Another object of the invention is to provide a process for the preparation of polymers from diisocyanates by intramolecular-intermolecular cyclic polymerization procedures. A further object of the invention is to provide fibers, filaments, films and other shaped articles from such polymers. Other objects and advantages will become apparent from a consideration of the description of the invention which follows hereafter.

In general, these and other objects of the invention are accomplished by treating a solution of an organic diisocyanate which may be trimethylene diisocyanate or alkyl and aryl substituted trimethylene diisocyanate with an alkali metal anionic catalyst at a temperature of from about $-20°$ C. to about $-100°$ C. or lower. The reaction is conducted under anhydrous conditions in a non-reactive solvent for the organic diisocyanate and the catalyst. The reaction mixture is stirred for several minutes and a high yield of diisocyanate polymers is produced.

The diisocyanate polymers of this invention are prepared from trimethylene diisocyanate and from substituted trimethylene diisocyanates. Such diisocyanates may be represented by the general formula

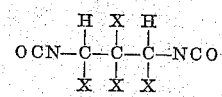

wherein X may be a hydrogen, an alkyl of from 1 to 10 carbon atoms, an aryl of 6 to 10 carbon atoms or any other non-reactive substituent. In addition to trimethylene diisocyanate, suitable substituted trimethylene diisocyanates which may be used in the practice of the invention include 2,2-dimethyltrimethylene diisocyanate, 1,2,3-trimethyltrimethylene diisocyanate, 2-ethyltrimethylene diisocyanate, 3-methyltrimethylene diisocyanate, 1,3-dimethyltrimethylene diisocyanate, 2,2-diethyltrimethylene diisocyanate, 2-propyltrimethylene diisocyanate, 2,2-diphenyltrimethylene diisocyanate and the like.

The temperature of the polymerization reaction in this invention must be below about $-20°$ C. to insure a substantial yield of the desired polymer and to preclude side reactions. Generally, the temperature may vary from about $-20°$ C. to about $-100°$ C. or lower, preferably between about $-40°$ C. and $-80°$ C.

Catalysts which are suitable for the polymerization reaction are anionic polymerization catalysts containing an alkali metal and soluble in the polymerization reaction mixture. Applicable examples include sodium, sodio naphthalene, sodium ketyls, sodium hydrosulfide and sodium cyanide. These catalysts are especially effective when used with dimethylformamide as a solvent for the reaction. The corresponding lithium and potassium compounds, when soluble, are effective also. The preferred initiator is sodium cyanide in dimethylformamide.

Organic solvents which are unreactive with the monomers and the catalyst and which are liquid at temperatures below about $-20°$ C. are suitable reaction media for carrying out the polymerization of trimethylene diisocyanates. Applicable solvents include N,N'-dialkylamides such as dimethylformamide and dimethylacetamide, triethylamine, dichloromethane, ethylene glycol dimethyl ether and diethylene glycol dimethyl ether. A mixture of dimethylformamide and dimethylacetamide permits the use of a lower polymerization temperature than that obtainable by the use of dimethylformamide alone. The preferred solvent is dimethylformamide. The concentration of monomer in the reaction medium may range from about 1 percent to about 50 percent by weight or higher. Monomer concentrations below 20 percent are preferred.

The amount of catalyst employed depends upon the amount of monomer to be polymerized. In any event, a catalytic amount, from about 0.0001 mole to around 0.01 mole per mole of diisocyanate, is required. Larger amounts may be necessary if impurities are present in sufficient quantities to interfere with the operation of the catalyst.

The polymerization reaction which takes place is a cyclic polymerization through the carbon-nitrogen double bonds of the diisocyanate via an intramolecular-intermolecular chain propagation mechanism. The reaction may be represented as follows:

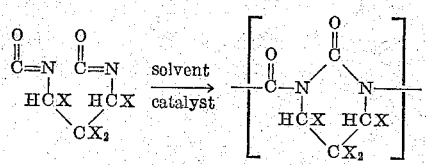

wherein X represents hydrogen, lower alkyl containing from 1 to 10 carbon atoms, or aryl of from 6 to 10 carbon atoms. The resulting polymers, poly(trimethylene diisocyanate) and substituted poly(trimethylene diisocyanates) may be described as consisting of a chain of six-membered cyclic ureas joined to each other by carbonyl group. Poly(trimethylene diisocyanate) possesses excellent thermal stability and a surprisingly higher melting point than polyamides from monoisocyanates. Polyamides from monoisocyanates have melting points of only up to about 250° C. whereas poly(trimethylene diisocyanate) has a melting point of 420–425° C. The polymer is highly crystalline and is obtained in high yields.

In order to further illustrate the present invention and the advantages thereof the following specific examples are given, it being understood that these are merely intended to be illustrative. In the examples all parts and percents are by weight unless otherwise indicated. The polymers were characterized by solubility tests, differential thermal analysis (DTA), thermogravimetric analysis (TGA), and inherent viscosity, infrared spectroscopy and X-ray diffraction.

Example I

A mixture of 4.6 ml. of trimethylene diisocyanate and 100 ml. of distilled dry, N,N'-dimethylformamide is added to a flask equipped with a stirrer, argon inlet and outlet, thermometer and cooled under an argon atmosphere to −45° C. in a Dry Ice-butyrolactone bath. Then 3 drops of a saturated solution of sodium cyanide in dimethylformamide is added to the stirred reaction mixture. The mixture is stirred at −45° to −48° C. for 2 hours then removed and the contents of the flask added to 300 ml. of rapidly stirred methanol. The precipitate is removed by filtration and washed thoroughly by stirring in a Waring Blendor with an additional 250 ml. of methanol, filtered and dried in vacuo. The dried material is ground to pass a No. 60 sieve, then redried. The white poly(trimethylene diisocyanate) so obtained melts with decomposition at about 420–425° C. The polymer is insoluble in all common organic solvents but is highly swollen by several solvents. The polymer is soluble with some degradation in sulfuric acid and may be recovered by precipitation into water. Organic solvents which act as swelling agents include a mixture of 13 percent water and 87 percent chloral hydrate, formic acid, 1,1,1-trichloro-3-nitro-2-propanol, 1,3-dichloro-2-propanol, 1,1,1-trichloro-2-methyl-2-propanol, 2,2,2-trichloro-1-ethoxy-ethanol, 2,4,6-trichlorophenol, o-chlorophenol, m-cresol and trifluoroacetic acid. Most of these compounds appeared to give some solution of the polymer, but the resulting mixtures could best be described as gels. The polymer in KBr gave an infrared spectrum which was consistent with that of a "nylon 1" structure with characteristic strong absorption for carbonyl groups at 5.9–6.0. Examination of the polymer so obtained by differential thermal analysis and by thermogravimetric analysis combined with visual observation of the melting behavior, gave evidence of the unusual and surprising thermal stability of the polymer. The polymer exhibits an exotherm at 270° C. which is surprisingly similar to exotherms attributed to crystallization in polymers such as poly(ethyleneterephthalate). Polymer decomposition is observed to take place at 420–425° C. by the presence of a large endotherm at this temperature and substantial weight loss on the TGA plot. The TGA confirms the outstanding thermal stability of the polymer since the sample retains 93 percent of its original weight up to a temperature of 400° C.

Example II

A solution of 1 ml. of trimethylene diisocyanate and 50 ml. of dimethylformamide is cooled to −49° C. under argon. While the mixture is stirred, 0.5 ml. of a saturated solution of sodium cyanide in dimethylformamide is added through a syringe stopper. Polymerization occurs immediately, the temperature rises to −42° C., and a white powdery material precipitates. The contents of the flask is stirred for 30 minutes at −49° C. At the end of this period of time the contents of the flask are added to 300 ml. of rapidly stirred methanol, filtered, then washed again with methanol by stirring with 200 ml. of methanol in a Waring Blendor. The polymer is air dried, ground to pass a 60 mesh sieve and dried in a vacuum oven at 70° C. and 25 inches Hg vacuum for 48 hours. A yield of 0.95 g. of a white powdery polymer melting with decomposition at 420–430° C. is obtained. The polymer was readily soluble in concentrated sulfuric acid. Polymer concentrations of from 0.5 to 50 percent solids may be prepared. Films were prepared from a cresol solution of the polymer.

Example III

The procedure of Example I is followed using 2.47 g. of trimethylene diisocyanate, 50 ml. of dimethylformamide, and 0.47 g. of a saturated solution of sodium cyanide in dimethylformamide. The initial temperature is −48° C. and the maximum −39° C. during the exotherm. An 83 percent yield of polymer is obtained which has an inherent viscosity of 0.119 measured in sulfuric acid at 30° C. on a solution of 0.61 g. of polymer in 100 ml. of dimethylformamide.

It will be understood to those skilled in the art that many apparently widely different embodiments of this invention can be made without departing from the spirit and scope thereof. Accordingly, it is to be understood that this invention is not to be limited to the specific embodiments thereof except as defined in the appended claims.

We claim:

1. A linear polymer comprising regularly recurring structural units having the general formula:

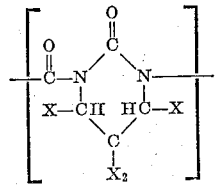

wherein X is selected from the group consisting of hydrogen, alkyl radicals of from 1 to 10 carbon atoms and phenyl.

2. The polymer of claim 1 wherein X is hydrogen.
3. The polymer of claim 1 wherein X is methyl.
4. The polymer of claim 1 wherein X is phenyl.
5. A process for the preparation of linear thermoresistant polymers from diisocyanates comprising treating a solution of an organic diisocyanate having the general structural formula:

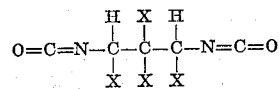

wherein X is selected from the group consisting of hydrogen, alkyl radicals of from 1 to 10 carbon atoms and phenyl in an inert organic solvent reaction medium under anhydrous conditions with an alkali metal anionic polymerization catalyst soluble in said inert reaction medium at a temperature below about −20° C.

6. The process of claim 5 wherein X is hydrogen.
7. The process of claim 5 wherein the inert organic solvent reaction medium comprises dimethylformamide.
8. The process of claim 5 wherein the inert organic solvent reaction medium comprises a mixture of dimethylformamide and dimethylacetamide.
9. The process of claim 5 wherein the alkali metal anionic polymerization catalyst is sodium cyanide.
10. The process of claim 5 wherein the temperature is from −35° C. to −50° C.
11. A process for the preparation of poly(trimethylene diisocyanate) comprising treating a solution of trimethylene diisocyanate in dimethylformamide under anhydrous conditions with a catalytic amount of sodium cyanide at a temperature of from −40° C. to −50° C.
12. The process of claim 5 wherein X is methyl.
13. The process of claim 5 wherein X is phenyl.
14. The process of claim 5 wherein the inert organic solvent reaction medium comprises dimethylacetamide.
15. The process of claim 5 wherein the inert organic solvent reaction medium comprises triethylamine.
16. The process of claim 5 wherein the alkali metal anionic polymerization catalyst is sodium hydrosulfide.
17. The polymer of claim 1 in the form of a fiber.
18. The polymer of claim 1 in the form of a film.

No references cited.